US 6,533,290 B2

(12) United States Patent
Marchand

(10) Patent No.: US 6,533,290 B2
(45) Date of Patent: Mar. 18, 2003

(54) MACHINE TOOL FEEDER CHUCK

(75) Inventor: Alain Marchand, Marnaz (FR)

(73) Assignee: E.C.S.-Engineering Carbide Systems, Marnaz (FR)

( * ) Notice: Subject to any disclaimer, the term of this patent is extended or adjusted under 35 U.S.C. 154(b) by 42 days.

(21) Appl. No.: 09/822,930

(22) Filed: Mar. 30, 2001

(65) Prior Publication Data

US 2001/0028149 A1 Oct. 11, 2001

(30) Foreign Application Priority Data

Apr. 10, 2000 (FR) .............................................. 00 04790

(51) Int. Cl.⁷ .......................... B23B 13/00; B23B 31/20
(52) U.S. Cl. ............................................. 279/20.1
(58) Field of Search ...................................... 279/20.1

(56) References Cited

U.S. PATENT DOCUMENTS

| | | | | |
|---|---|---|---|---|
| 2,563,464 A | * | 8/1951 | Green | 279/20.1 |
| 2,680,623 A | * | 6/1954 | Hasselblad et al. | 279/20.1 |
| 2,817,534 A | * | 12/1957 | Cox | 279/20.1 |
| 4,336,947 A | * | 6/1982 | Franklin | 279/20.1 |

FOREIGN PATENT DOCUMENTS

| | | | |
|---|---|---|---|
| DE | 1197632 | 7/1965 | |
| DE | 2243119 | * 3/1974 | ............... 279/20.1 |
| DE | 2405527 | 8/1975 | |
| DE | 2602300 | * 7/1976 | ............... 279/20.1 |
| DE | 3600445 | 7/1986 | |
| DE | 19842734 | 4/2000 | |
| EP | 813923 | 12/1997 | |

* cited by examiner

Primary Examiner—Raleigh W. Chiu
(74) Attorney, Agent, or Firm—William H. Eilberg

(57) ABSTRACT

A feeder chuck according to the invention includes a tubular chuck body with an axial bore through which a bar is passed, with a downstream section including longitudinal slots enabling elastic deformation in the radial direction. An exterior envelope with an internal conical clamping bearing surface comes into contact with an external conical clamping bearing surface of the chuck body, and is screwed onto the chuck body. The intermediate portion of the exterior envelope has a capacity for elastic deformation in the longitudinal direction, for example by virtue of oblique openings. The feeder chuck therefore has a capacity for adjustment of its diameter combined with improved radial retention of the bar.

15 Claims, 4 Drawing Sheets

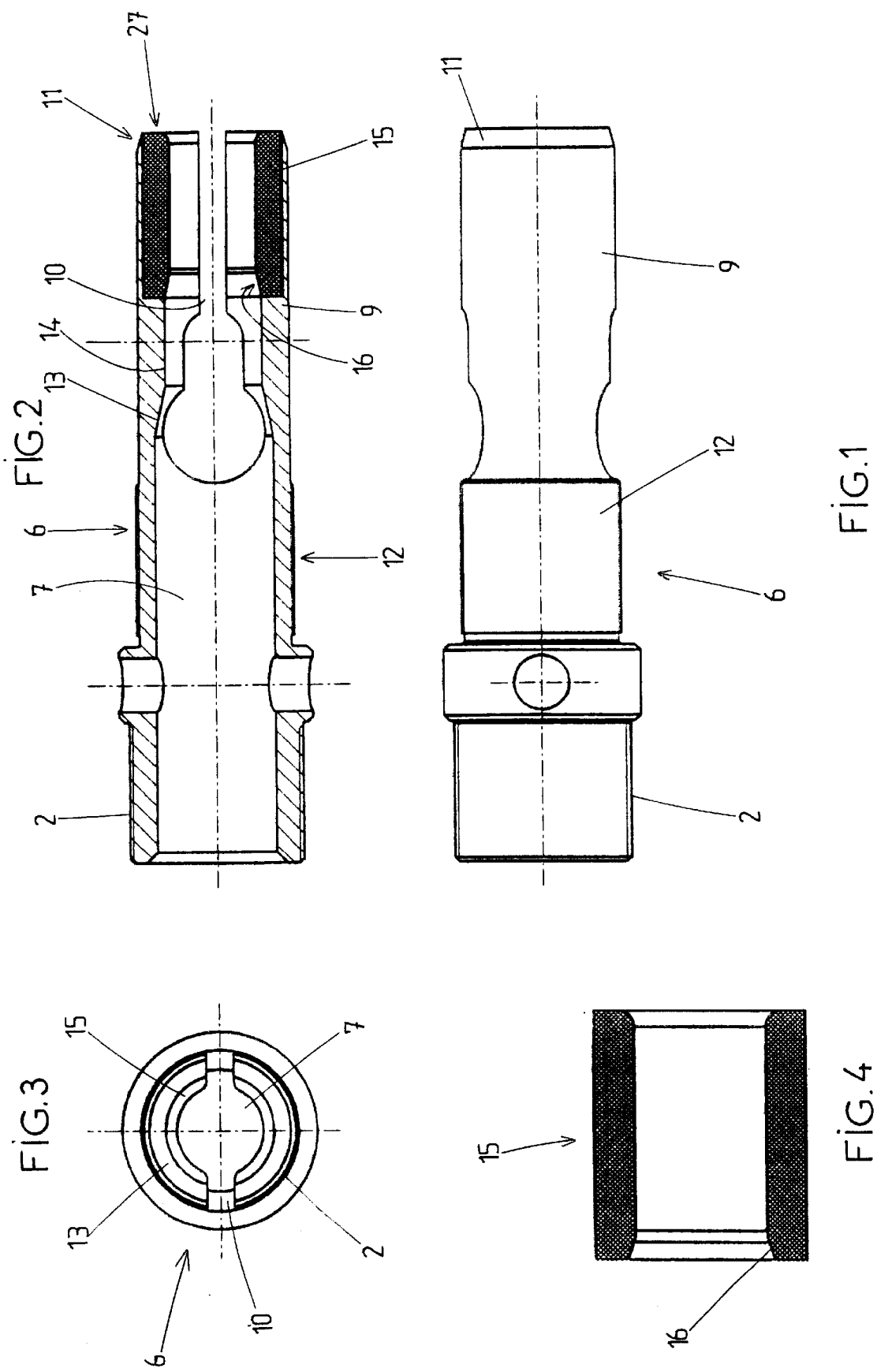

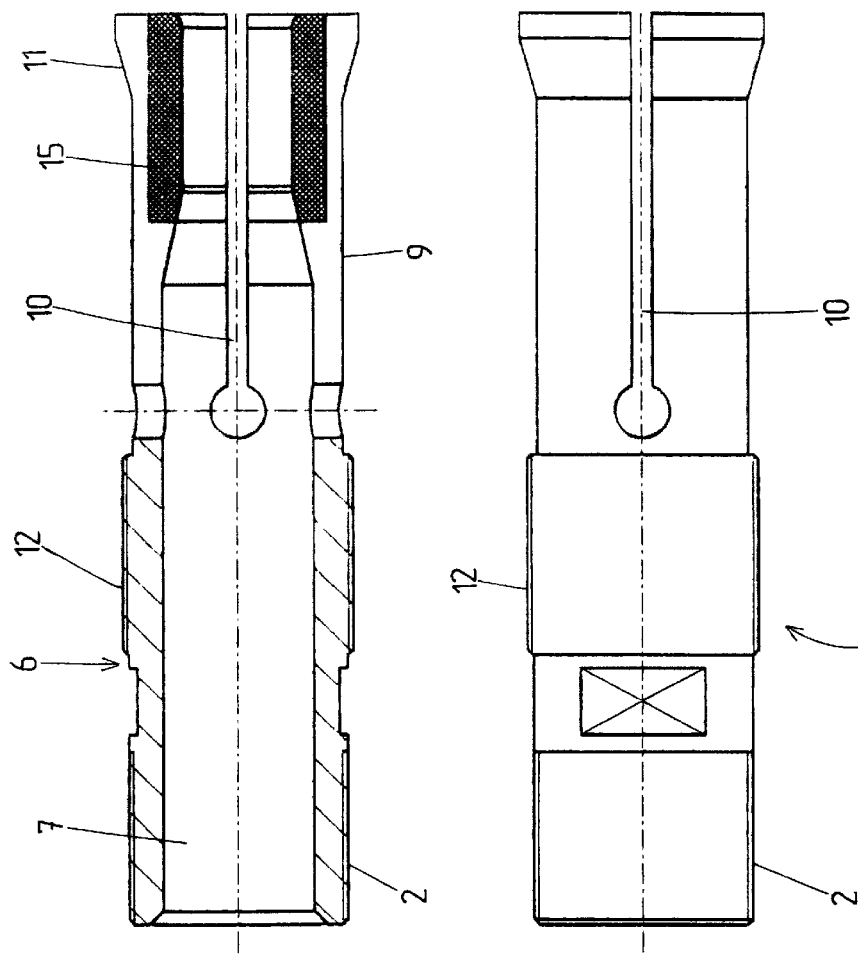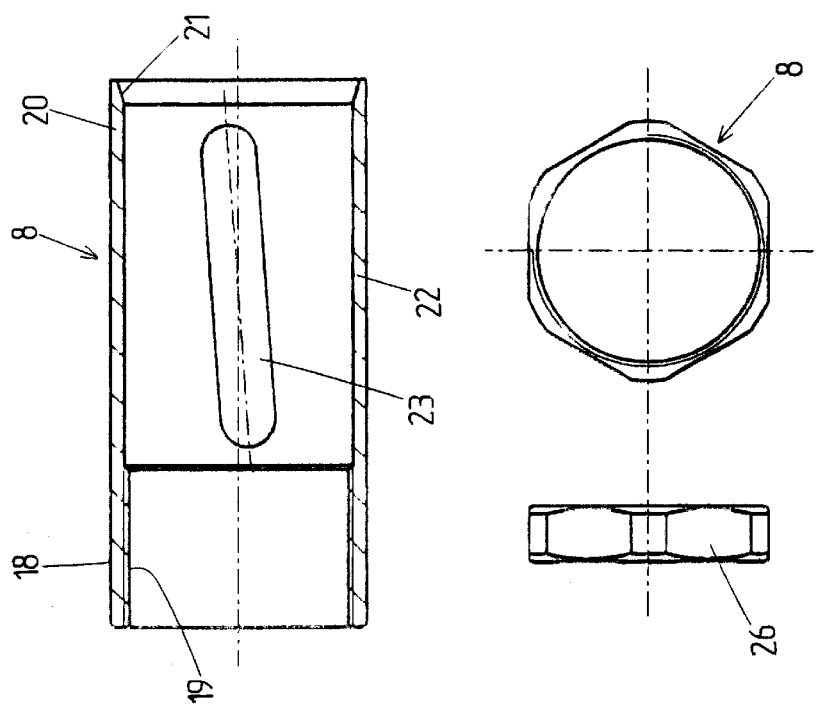

MACHINE TOOL FEEDER CHUCK

BACKGROUND OF THE INVENTION

1. Field of the Invention

The present invention relates to feeder chucks used in machine tools to advance a bar to be machined when it is introduced into a gripper chuck.

In a machine tool, the portion of bar to be machined is held by a gripper chuck which holds it firmly during machining by the tools of the machine tool. Machining consists of removing material from a section of bar whose length is equal to that of the part to be made.

Between machining two successive parts, the part that has just been made is ejected, and the bar must be advanced to introduce its end into the gripper chuck. The bar is advanced by a feeder chuck which grasps the bar sufficiently by friction to overcome all forces resisting the advance of the bar and inserts it into the gripper chuck. The feeder chuck is mounted on a carrier which slides longitudinally in the machine tool relative to the gripper chuck.

2. Description of the Prior Art

Machine tool feeder chucks generally include a tubular chuck body having an axial bore through which a bar to be introduced into the machine tool is passed, and which has a downstream chuck body section which can deform elastically in the radial direction to bear elastically on the outside surface of the bar. The bar is forced into the feeder chuck, for example by a bar feeder that pushes it in the longitudinal direction, and the bar spreads the branches of the feeder chuck apart elastically. The stiffness of the branches of the feeder chuck must be chosen to grip the bar appropriately in the radial direction to provide a particular axial holding force between satisfactory minimum and maximum values. For the most usual bar diameters an axial bar holding force from 400 to 600 Newtons is required, for example.

A feeder chuck of the above kind is not adjustable. The problem is that the axial retaining force that it applies to the bar essentially depends on the diameter of the bar. In mass production, the bar diameters can differ slightly from one batch to another, which induces a variation in the axial holding force applied by the feeder chuck which can be outside the tolerance limits for the axial holding force.

To avoid this problem, adjustable feeder chucks were proposed many years ago, like those described in the document DE 2 405 527 A, for example. The tubular chuck body described in that document further includes an exterior envelope having an internal clamping conical bearing surface that is adapted to come into contact with via corresponding external conical clamping bearing surface of the chuck body, and has an interior screwthread section co-operating by means of a screwing action with an exterior screwthread of the chuck body to clamp the chuck body downstream section radially against the exterior surface of the bar. The envelope includes longitudinal slots into which lugs projecting from the exterior face of the chuck body can be inserted to prevent the exterior envelope rotating relative to the chuck body. A special tool is used to clamp the chuck body radially and to drive rotation of the chuck body in the exterior envelope, to modify the longitudinal position of the chuck body relative to the exterior envelope by means of a screwing action and thereby modify the clamping of the bar.

This kind of device has the disadvantage that it necessitates a special tool for clamping the chuck body radially and allowing it to rotate for the adjustment by screwing so that the immobilising lugs are withdrawn from the immobilising slots in the exterior envelope. Also, the adjustment is discontinuous because the lugs necessarily have to engage in one of the longitudinal slots of the exterior envelope. Further, this structure cannot be applied to parts to be machined which have a small diameter, because the proportion of the diameter occupied by the chuck to withstand mechanical forces is then too large to enter the corresponding housings of the machine tool. This kind of arrangement is even more inapplicable to chucks whose bearing surface is made of carbide, given the necessary overall size of the carbide part.

It has also been proposed to make the clamping surface of feeder chucks from carbide, i.e. from a sintered mixture of tungsten carbide, cobalt and nickel, because this kind of structure slides freely on steel and prevents the binding that is sometimes observed if a steel chuck is used. However, prior art chucks with a carbide clamping surface, as described in the document EP 0 813 923 A, for example, are not adjustable in diameter, and scratch some bars because the elastic travel of the chuck is too great if the bar has a large diameter.

SUMMARY OF THE INVENTION

The problem addressed by the present invention is that of proposing a new adjustable feeder chuck structure, designed to reduce the production of scratches on the bars and to increase its service life by limiting rubbing on the bar.

Another object of the invention is to design a feeder chuck structure of this kind that can be used even for small bar diameters, offers continuous diameter adjustment, requires no special adjuster tool, and is very convenient to adjust on the machine tool.

Another object of the invention is to improve the holding of the bar, by providing rigid and symmetrical holding of the bar centred facing the gripper chuck, with no possibility of splaying or off-centring.

To achieve the above and other objects, a machine tool feeder chuck in accordance with the invention includes:
- a tubular chuck body having an axial bore through which a bar to be inserted into the machine tool is passed,
- a screwthreaded upstream section for fixing the chuck to a feeding carriage of the machine tool,
- a chuck body downstream section, including longitudinal slots so that it has a capacity for elastic deformation in the radial direction enabling it to bear on the exterior surface of the bar, and including an external conical clamping bearing surface,
- an exterior envelope, having a downstream section with an internal conical clamping bearing surface in contact with the external conical clamping bearing surface of the chuck body, and having an upstream section with an interior screwthread meshing with an exterior screwthread of the chuck body to clamp the downstream section of the chuck body in the radial direction;

in accordance with the invention:
- the screwthreaded fixing upstream section of the chuck is fastened to the chuck body,
- the exterior envelope has a structure having a high resistance to radial expansion in its downstream section with the internal conical clamping bearing surface,
- the exterior envelope includes means conferring on it a capacity for elastic deformation in the longitudinal direction in the part of its length between the internal conical clamping bearing surface and the interior screwthread.

The operation of a feeder chuck of the above kind in accordance with the invention differs from the operation of a prior art adjustable chuck.

In prior art adjustable chucks, to preserve the capacity for radial elastic deformation of the chuck on inserting the bar or when it slides in the feeder chuck, the area clamped by the conical clamping bearing surfaces is offset axially relative to the area of the bar on which the chuck body bears. Thus, the elasticity of the feeder chuck is provided by members in the form of longitudinal tongues that flex in the radial direction independently of each other. If the bar applies a radial force to the feeder chuck, only a portion of the periphery of the feeder chuck holds the bar centred. This results in elastic holding which lacks stiffness.

In contrast, with the structure according to the invention, the capacity for elastic deformation in the radial direction, that is necessary for inserting the bar or for it to slide relative to the feeder chuck, is provided not by the downstream section of the chuck body with longitudinal slots, but by the capacity for elastic deformation in the longitudinal direction of the exterior envelope, whose structure also has a high resistance to radial expansion. Consequently, when the bar applies a radial force to the feeder chuck, the whole of the stiffness of the exterior envelope, rather than only a portion of its periphery, contributes to holding the bar centred. The feeder chuck structure in accordance with the invention therefore achieves much more effective centred holding of the bar against lateral oscillations.

At the same time, the adjustment of this kind of structure is continuous, and requires no special tool such as a clamping tool to allow relative rotation of the chuck body in the exterior envelope.

The longitudinal portion of the chuck body directly facing the internal clamping conical bearing surface of the exterior envelope preferably bears radially on the bar.

In a first embodiment, the clamping conical bearing surfaces have their apex oriented in the upstream direction.

In a preferred embodiment, the clamping conical bearing surfaces have their apex oriented in the downstream direction.

In one advantageous embodiment that is efficient, economical and easy to manufacture, the means conferring a capacity for longitudinal elastic deformation include elongate openings oriented obliquely to the longitudinal axis of the exterior envelope and distributed around the longitudinal axis in the exterior envelope portion between the internal conical clamping bearing surface and the interior screwthread.

Good results have been obtained by providing elongate openings inclined at an angle from approximately 5° to approximately 12° to the longitudinal axis. An inclination of about 8° would appear advantageous.

The elongate openings can have a width similar to that of the oblique longitudinal members that flank them. Their number is chosen according to the required stiffness characteristics. Four to six elongate openings may be suitable for the most usual chuck diameters.

In one convenient embodiment, the means for preventing the exterior envelope from rotating relative to the chuck body can include a lock-nut screwed onto the exterior screwthread of the chuck body.

In one advantageous embodiment, the external conical clamping bearing surface of the chuck body is formed on the downstream end face of the chuck body.

In this case, the external conical clamping bearing surface of the chuck body can advantageously be relieved by reducing the diameter in the vicinity of the downstream ends of the longitudinal slots.

Other objects, features and advantages of the present invention will emerge from the following description of particular embodiments, which description is given with reference to the accompanying drawings.

BRIEF DESCRIPTION OF THE DRAWINGS

FIG. 1 is a side view of a machine tool feeder chuck in accordance with a first embodiment of the present invention.

FIG. 2 is a side view in longitudinal section of the feeder chuck shown in FIG. 1.

FIG. 3 is a view of the upstream face of the feeder chuck shown in FIG. 1.

FIG. 4 is a side view to a larger scale and in longitudinal section showing the carbide insert in the FIG. 2 embodiment.

FIG. 9 is a side view of a chuck body in accordance with a second embodiment of the present invention.

FIG. 10 is a side view in longitudinal section of the chuck body shown in FIG. 9.

FIG. 11 is a side view in longitudinal section of an exterior envelope in accordance with the second embodiment of the present invention.

FIG. 12 is a view of the upstream face of the exterior envelope shown in FIG. 11.

FIG. 13 shows the lock-nut for preventing the exterior envelope from rotating on the chuck body in the second embodiment.

DETAILED DESCRIPTION OF THE PREFERRED EMBODIMENTS

Figure 8:
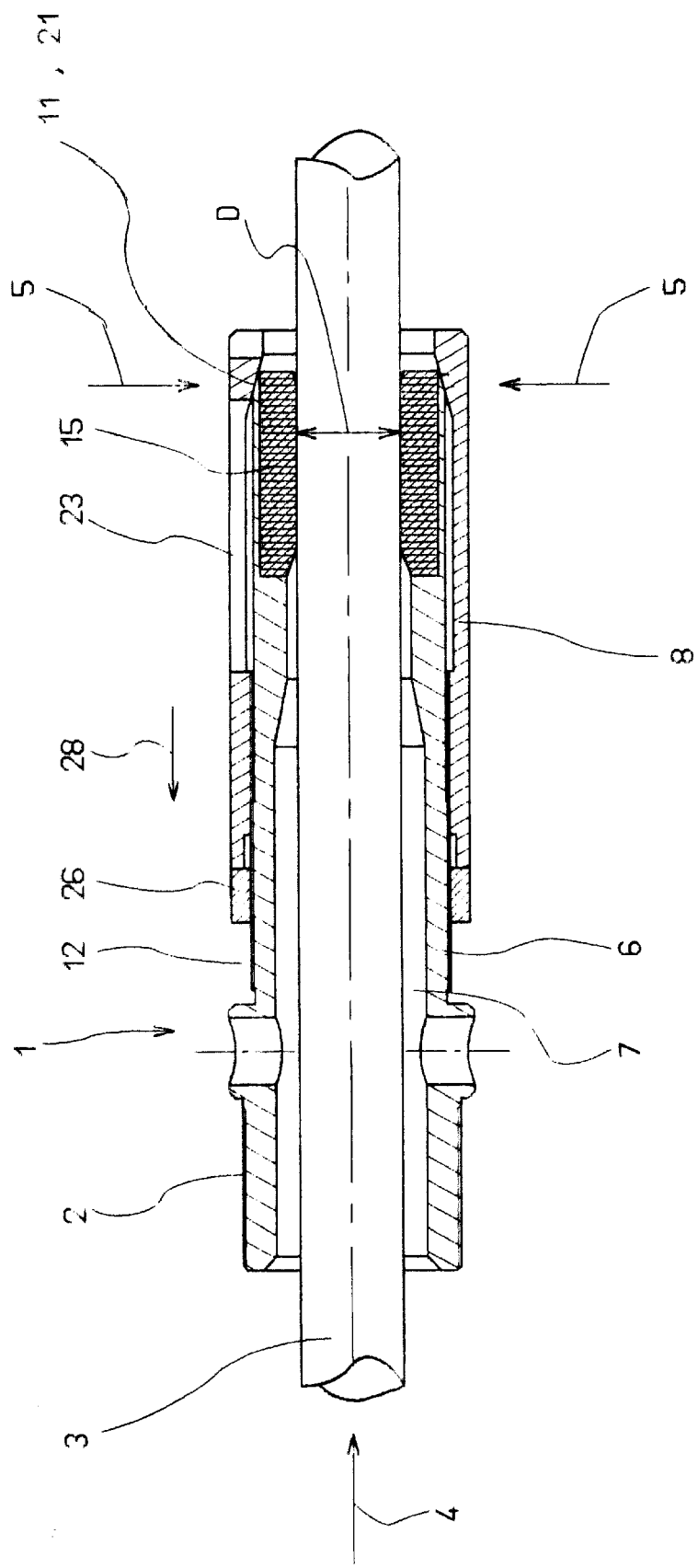
FIG. 8 is a side view in longitudinal section showing the feeder chuck assembled in accordance with the first embodiment, with a bar engaged in the chuck.

Refer first to FIG. 8, showing the general structure of the feeder chuck in accordance with a first embodiment of the invention. The feeder chuck 1 includes a threaded upstream section 2 for fixing the feeder chuck 1 to a machine tool feeding carriage, not shown. The feeder chuck 1 is shaped to hold a bar 3 and to advance it in the downstream direction, as shown by the arrow 4, in order to insert a section of bar of particular length into a machine tool gripper chuck, not shown, located to the right of FIG. 8. To this end, the feeder chuck 1 applies to the bar 3 an elastic radial clamping force indicated by the arrows 5.

The feeder chuck 1 includes a tubular chuck body 6 having an axial bore 7 through which the bar 3 to be inserted into the machine tool passes.

The feeder chuck 1 also includes a tubular exterior envelope 8, shaped to apply to the chuck body 6 the radial clamping force 5 for clamping the bar 3.

Referring to FIGS. 1 and 2, showing the chuck body 6 more specifically, the chuck body 6 includes a downstream chuck body section 9, incorporating longitudinal slots such as the slot 10 so that it has a capacity for elastic deformation in the radial direction enabling it to bear on the exterior surface of the bar 3. The downstream section 9 of the chuck body also includes an external conical clamping bearing surface 11. The intermediate part of the chuck body 6 includes an exterior screwthread 12. The figures also show the screwthreaded upstream section 2 of the chuck body 6 for fixing the feeder chuck 1 to a machine tool feeding carriage.

The downstream section 9 of the chuck body 6 includes, in the upstream to downstream direction, a first conical constriction 13 for guiding the bar, and then a cylindrical section 14. In the embodiment shown, the chuck body 6 is mainly made of steel, with a tubular insert 15 of a hard material forming the downstream area of the axial bore 7. The insert 15 includes a conical entry portion 16, constituting a second constriction of the axial bore 7 with a small angle, preventing the end of the bar from striking the insert 15. This enables the use of an insert of a fragile hard material, for example carbide.

Figure 5:
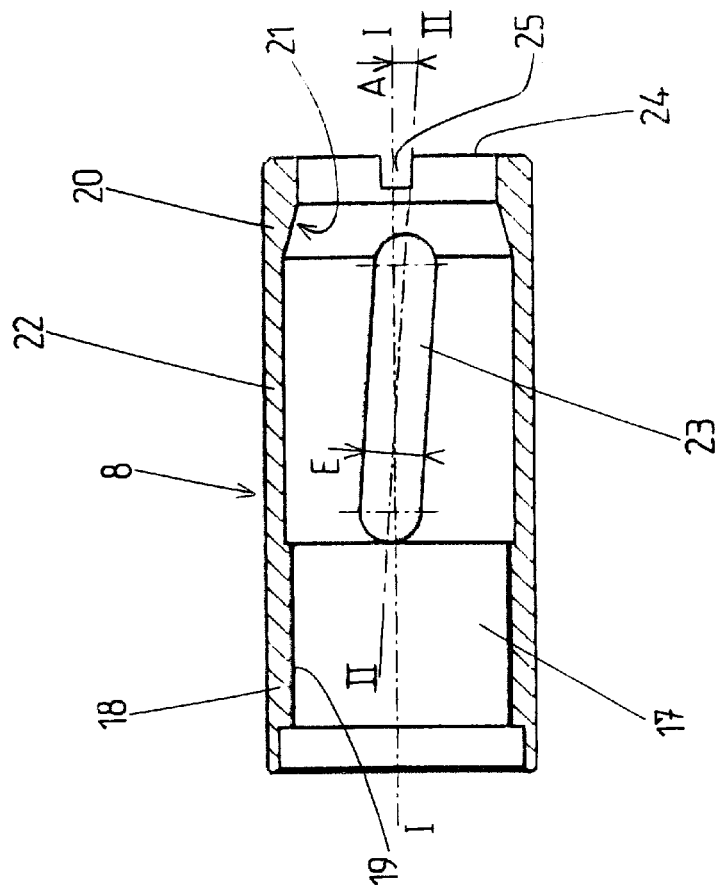
FIG. 5 is a side view in longitudinal section of an exterior envelope in accordance with the first embodiment of the present invention.
Figure 6:
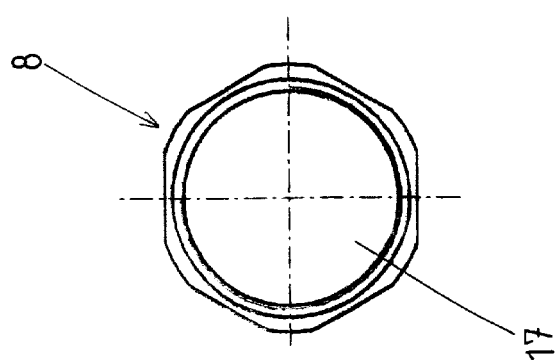
FIG. 6 is a view of the upstream face of the exterior envelope shown in FIG. 5.
Figure 7:
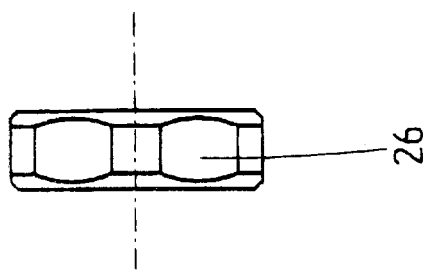
FIG. 7 shows the lock-nut for preventing rotation of the exterior envelope on the feeder chuck body.

Refer now to FIGS. 5 and 6, showing the exterior envelope 8 more specifically. The generally tubular exterior envelope 8 has a central bore 17 through which the chuck body 6 passes, and has an upstream section 18 with an interior screwthread 19 which screws onto the exterior screwthread 12 of the chuck body 6 (see FIGS. 1 and 2). The exterior envelope 8 includes an annular downstream section 20 having an internal conical clamping bearing surface 21 that comes into contact with the external conical clamping bearing surface 11 of the chuck body 6.

Between the upstream section 18 with the interior screwthread 19 and the downstream section 20 with the internal conical clamping bearing surface 21, the exterior envelope 8 includes an intermediate section 22 which has a capacity for elastic deformation in the longitudinal direction. In the embodiment shown in the figures, the capacity for elastic deformation in the longitudinal direction is provided by elongate openings, such as the opening 23, oriented obliquely to the longitudinal axis I—I of the exterior envelope 8, and distributed around the longitudinal axis I—I. Thus, in FIG. 5, the elongate opening 23 has a longitudinal axis II—II at an angle A to the longitudinal axis I—I of the exterior envelope 8 that can advantageously be in thee range from 5° to 12°.

FIG. 5 shows a single oblique elongate opening 23. Obviously a plurality of openings 23 are provided, which can advantageously have a width E similar to the width of the oblique longitudinal members that flank them.

The internal conical clamping bearing surface 21 of the exterior envelope 8, and the external conical clamping bearing surface 11 of the chuck body 6, can both have a cone angle of approximately 15°. This value advantageously achieves a good clamping effect with no risk of jamming.

In the embodiment shown in FIG. 5, the downstream end 24 of the exterior envelope 8 includes gripping means for co-operating with a clamping tool. The gripping means can be front notches 25, for example.

In use, the exterior envelope 8 is prevented from rotating relative to the chuck body 6 by using a lock-nut 26 screwed onto the exterior screwthread 12 of the chuck body 6, as shown in FIG. 8.

In the first embodiment, shown in FIGS. 1 to 7, the clamping conical bearing surfaces 11 and 21 have their apex oriented in the downstream direction. In this case, the external conical clamping bearing surface 11 of the chuck body 6 is formed on the downstream end face 27 of the chuck body 6. The external conical bearing surface of the chuck body 6 is then advantageously relieved by reducing the diameter in the vicinity of the downstream ends of the longitudinal slots like the slot 10.

The chuck body 6 and the exterior envelope 8 can be made from spring steel.

The clamping part of the chuck body 6, or the part consisting of the downstream end of the downstream section 9 of the chuck body 6, can preferably include a hard interior coating adapted to constitute the clamping surface in contact with the bar 3.

In the embodiment shown in FIGS. 2 and 4, the clamping surface is constituted by a hard material part, formed by the insert 15. The hard material can be a sintered mixture of tungsten carbide, cobalt and nickel, for example.

In the second embodiment, shown in FIGS. 9 to 13, the feeder chuck 1 has the same main components, which are identified by the same reference numbers, namely: a chuck body 6, an exterior envelope 8 and an immobilising lock-nut 26. The exterior envelope 8 essentially includes oblique openings 23 in its intermediate section 22 situated between an upstream section 18 with an interior screwthread and an annular downstream section 20 with an internal conical clamping bearing surface 21. The chuck body 6 includes a screwthreaded fixing upstream section 2, a downstream section 9 with an external conical clamping bearing surface 11, longitudinal slots 10, and an externally screwthreaded intermediate section 12.

In this second embodiment, the clamping conical bearing surfaces 11 and 21 have their apex oriented in the upstream direction.

Referring again to FIG. 8, in use, the exterior envelope 8 is screwed onto the chuck body 6 by a chosen amount, determining its axial displacement 28 which, by bearing of the clamping conical bearing surfaces 11 and 21 against each other, determines the interior diameter D of the feeder chuck 1. The axial position of the upstream section 18 of the exterior envelope 8 is then fixed by tightening the lock-nut 26 against the upstream end of the exterior envelope 8. The bar 3 is introduced by pushing it in the upstream to downstream direction as indicated by the arrow 4, and it radially pushes back the chuck clamping portion consisting of the insert 15 of the chuck body 6. Because of the radial thrust exerted by the bar 3, the downstream chuck body section 9 with the longitudinal slots 10 tends to expand radially but is retained by the annular downstream section 20 of the exterior envelope 8 which constitutes a structure that is highly resistant to radial expansion. The clamping conical bearing surfaces 11 and 21 transform the radial thrust force due to the bar into a longitudinal elongation force applied to the exterior envelope 8. The exterior envelope 8 is elongated elastically because of the capacity for torsion of its intermediate section 22. The capacity for elastic deformation by elongation of the exterior envelope 8 is very small, but corresponds to the diameter tolerances for a batch of bars 3. The exterior envelope 8 constitutes a very stiff spring, which ensures satisfactory retention of the bar 3.

The present invention is not limited to the embodiments that have been described explicitly, but includes variants and generalisations thereof within the scope of the following claims.

There is claimed:

1. A machine tool feeder chuck, including:
   a tubular chuck body having an axial bore through which a bar to be inserted into the machine tool is passed,
   a screwthreaded upstream section for fixing the chuck to a feeding carriage of the machine tool,
   a chuck body downstream section, including longitudinal slots so that it has a capacity for elastic deformation in the radial direction enabling it to bear on the exterior surface of the bar, and including an external conical clamping bearing surface, an exterior envelope, having a downstream section with an internal conical clamping bearing surface in contact with the external conical clamping bearing surface of the chuck body, and having an upstream section with an interior screwthread meshing with an exterior screwthread of the chuck body to clamp the downstream section of the chuck body in the radial direction, wherein:

the screwthreaded fixing upstream section of the chuck is fastened to the chuck body, the exterior envelope has a structure having a high resistance to radial expansion in its downstream section with the internal conical clamping bearing surface, the exterior envelope includes means conferring on it a capacity for elastic deformation in the longitudinal direction in the part of its length between the internal conical clamping bearing surface and the interior screwthread.

2. A feeder chuck according to claim 1, wherein the longitudinal portion of the chuck body directly facing the internal conical clamping bearing surface of the exterior envelope bears radially on the bar.

3. A feeder chuck according to claim 1, wherein the clamping conical bearing surfaces have their apex oriented in the upstream direction.

4. A feeder chuck according to claim 1, wherein the clamping conical bearing surfaces have their apex oriented in the downstream direction.

5. A feeder chuck according to claim 1, wherein the means conferring on it a capacity for elastic deformation in the longitudinal direction include elongate openings oriented obliquely to the longitudinal axis of the exterior envelope and distributed around the longitudinal axis in the portion of the exterior envelope between the internal conical clamping bearing surface and the interior screwthread.

6. A feeder chuck according to claim 5, wherein the elongate openings are inclined to the longitudinal axis at an angle in the range from approximately 5° to approximately 12°.

7. A feeder chuck according to claim 5, wherein the elongate openings have a width similar to that of oblique longitudinal members that flank them.

8. A feeder chuck according to claim 1, wherein the clamping conical bearing surfaces have a cone angle of approximately 15°.

9. A feeder chuck according to claim 1, wherein the downstream end of the exterior envelope includes gripping means for co-operating with a clamping tool.

10. A feeder chuck according to claim 1, further comprising means for preventing the exterior envelope from rotating relative to the chuck body, and wherein the preventing means include a lock-nut screwed onto the exterior screwthread of the chuck body.

11. A feeder chuck according to claim 1, wherein the external conical clamping bearing surface of the chuck body is formed on the downstream end face of the chuck body.

12. A feeder chuck according to claim 11, wherein the external conical clamping bearing surface of the chuck body is relieved by reducing the diameter in the vicinity of the downstream ends of the longitudinal slots.

13. A feeder chuck according to claim 1, wherein the chuck body and the exterior envelope are made of spring steel.

14. A feeder chuck according to claim 1, wherein the clamping part of the chuck body has a hard interior coating constituting the clamping surface in contact with the bar.

15. A feeder chuck according to claim 14, wherein the clamping surface is constituted by an insert made of a sintered mixture of tungsten carbide, cobalt and nickel.

* * * * *